(12) United States Patent
Döpfl

(10) Patent No.: US 6,590,160 B1
(45) Date of Patent: Jul. 8, 2003

(54) SEALING ELEMENT FOR A DEVICE FOR THE FIREPROOF LEAD-THROUGH OF LINE DEVICES AND THE LIKE THROUGH OPENINGS IN WALLS

(75) Inventor: Wolfgang Döpfl, Vienna (AT)

(73) Assignee: bst Brandschutztechnik Doepfl Gesellschaft mbH, Vienna (AT)

( * ) Notice: Subject to any disclaimer, the term of this patent is extended or adjusted under 35 U.S.C. 154(b) by 0 days.

(21) Appl. No.: 10/223,928

(22) Filed: Aug. 20, 2002

(51) Int. Cl.$^7$ ................................................. H02G 3/18
(52) U.S. Cl. ........................ 174/65 G; 174/152 G; 174/153 G; 174/65 R
(58) Field of Search ............... 174/65 R, 135, 174/72 A, 72 C, 74 A, 68.1, 68.3, 21 R, 24, 25 R, 153 G, 152 G, 77 R, 65 G, 155, 156, DIG. 8; 138/177, 103, DIG. 11; 285/423, 19, 20, 155.1, 333; 248/56; 277/639

(56) References Cited

U.S. PATENT DOCUMENTS

| | | | |
|---|---|---|---|
| 4,076,023 A | * 2/1978 | Martinez | 138/103 |
| 4,915,990 A | * 4/1990 | Chang | 174/DIG. 8 |
| 4,919,372 A | * 4/1990 | Twist et al. | 174/156 |
| 5,243,153 A | * 9/1993 | Holwerda | 248/56 |
| 5,470,622 A | * 11/1995 | Rinde et al. | 174/DIG. 8 |
| 5,540,450 A | * 7/1996 | Hayashi et al. | 174/152 G |
| 5,811,728 A | * 9/1998 | Maeda | 174/65 R |
| 6,010,134 A | * 1/2000 | Katoh | 174/152 G |
| 6,119,305 A | * 9/2000 | Loveall et al. | 174/152 G |
| 6,182,930 B1 | 2/2001 | Lindborg | |
| 6,278,061 B1 | * 8/2001 | Daoud | 174/65 R |
| 6,280,220 B1 | * 8/2001 | Horner | 174/153 G |
| 6,359,224 B1 | * 3/2002 | Beele | 174/65 G |
| 6,441,306 B1 | * 8/2002 | Iwaguchi | 174/65 R |

FOREIGN PATENT DOCUMENTS

| | | |
|---|---|---|
| DE | 1 960 276 | 6/1970 |
| EP | 0 429 916 B1 | 6/1991 |
| GB | 2 204 922 A | 11/1988 |
| WO | WO 97/36356 | 10/1997 |

* cited by examiner

Primary Examiner—Hung V. Ngo
Assistant Examiner—Angel R. Estrada
(74) Attorney, Agent, or Firm—Laurence A. Greenberg; Werner H. Stemer; Gregory L. Mayback

(57) ABSTRACT

The device for the fireproof lead-through of wires, cables, pipes and the like through openings in walls has a frame-shaped housing for a number of cuboidal packing pieces. The latter include two sealing elements with cross-sectionally semi-cylindrical inserts inserted in them. The inserts are formed on their inner side with at least approximately semi-annular ribs and on their outer side with semi-annular ribs and with semi-annular grooves located between the ribs. The sealing elements likewise have substantially semi-annular ribs and grooves equal and opposite to the grooves and ribs on the outside of the inserts. The inwardly protruding ribs of the inserts are located radially inside the semi-annular grooves located on the outer side of the inserts and the ribs are deformable, whereby they penetrate into the grooves located outside lines, pipes, cables and the like of different diameters inserted into the inserts to effect adaptation to them.

5 Claims, 3 Drawing Sheets

SEALING ELEMENT FOR A DEVICE FOR THE FIREPROOF LEAD-THROUGH OF LINE DEVICES AND THE LIKE THROUGH OPENINGS IN WALLS

BACKGROUND OF THE INVENTION

Field of the Invention

The present invention relates to a device for the fireproof lead-through of lines, cables, pipes and the like through openings in walls. The device has a frame-shaped housing for a number of cuboidal packing pieces, which comprise two sealing elements with cross-sectionally semi-cylindrical inserts inserted in them, whereby the diameters of the through-channels are adaptable to different diameters of lines, cables, pipes and the like, the inserts being formed on their inner side with at least approximately semi-annular ribs and on their outer side with semi-annular ribs and with semi-annular grooves located between the ribs, and the sealing elements being formed on their inner side with likewise at least approximately semi-annular ribs and grooves which are equal and opposite to the semi-annular grooves and ribs provided on the outer side of the inserts.

German published patent application DE 196 02 76 A1 discloses devices for the fireproof leading-through of lines and the like, wherein a plurality of packing pieces formed with through-channels are arranged. In this case there is the requirement for the lines inserted in the through-channels to be sealed to prevent smoke fumes from passing through. To meet this requirement, it is known from that reference to provide sealing elements with through-channels differing in the size of their diameter. However, this makes it necessary to have access to a very large number of differently formed packing pieces, from which the one with a through-channel of the required diameter must be selected in each case.

U.S. Pat. No. 6,182,930 B1 and the corresponding international PCT publication WO 97/36 356 also disclose packing pieces which comprise two mutually assigned sealing elements, which are formed in each case with a semi-cylindrical recess, each sealing element being formed with four tabs. The tabs can either be removed or be placed into the semi-cylindrical recess, whereby the packing pieces can be adapted to a large number of lines of different diameters.

Although the requirement for adaptation to lines differing greatly in diameter can be satisfied by a small number of such packing pieces of different sizes, these packing pieces are disadvantageous because they lead to a considerable wastage of material.

European patent EP 429 916 B1 also discloses a packing piece which likewise comprises two mutually assigned sealing elements formed with semi-cylindrical recesses, a large number of removable inserts being located in the recesses. To bring about an adaptation of the size of the through-channel to the cross section of the lines, various numbers of inserts can be removed from the through-channel.

That prior art packing piece is likewise disadvantageous because it causes very great material loss. Moreover, it is very labor-intensive because, depending on the diameter of the respective line or the like, it is necessary for a lesser or greater number of inserts to be removed.

British published patent application GB 2 204 922 A also discloses a packing piece which comprises two sealing elements with cross-sectionally semi-cylindrical inserts inserted in them, the inserts being formed on their inner side with at least approximately semi-annular ribs and on their outer side with semi-annular ribs and with semi-annular grooves located between the ribs, and the sealing elements being formed on their inner side with likewise at least approximately semi-annular ribs and grooves which are equal and opposite to the semi-annular grooves and ribs provided on the outer side of the inserts.

SUMMARY OF THE INVENTION

It is accordingly an object of the invention to provide a sealing element for a device for the fire-proof lead-through of a line through an opening in a wall which overcomes the above-mentioned disadvantages of the heretofore-known devices and methods of this general type and which improves a packing piece of the above type to the extent that it can be used and is fully effective for different diameters of lines, cables and the like.

With the foregoing and other objects in view there is provided, in accordance with the invention, a device for the fireproof lead-through of a line device through an opening in a wall, comprising:

a cuboidal packing piece formed of two sealing elements and cross-sectionally semi-cylindrical inserts inserted in the sealing elements;

the inserts being formed, on an inside thereof, with at least approximately semi-annular inner ribs and, on an outside thereof, with semi-annular outer ribs and with semi-annular grooves between the outer ribs;

the sealing elements being formed, on an inside thereof, with at least approximately semi-annular ribs and grooves configured to mesh with the semi-annular grooves and outer ribs on the inserts;

the inner ribs of the inserts being disposed radially inside the semi-annular grooves on the outside of the inserts; and the inner ribs of the inserts being deformable and adapted to penetrate into the semi-annular grooves on the inserts, whereby the inserts form through-channels adapted to a diameter of a respectively inserted line device inserted in the packing piece.

In other words, the objects of the invention are achieved by the inwardly protruding semi-annular ribs provided on the inner side of the inserts being located radially inside the semi-annular grooves located on the outer side of the inserts and by the ribs being deformable, whereby they penetrate into the grooves located outside lines, pipes, cables and the like of different diameters inserted into the inserts to effect adaptation to them.

Preferably, semi-annular grooves are formed between the ribs protruding from the inner side of the inserts. Furthermore, the width of the grooves of the sealing elements is preferably approximately twice the width of the ribs. According to a further preferred embodiment, depressions are provided in some of the grooves of the sealing elements. In this case it is also possible for some of the ribs protruding from the outer side of the inserts to be formed with additional projections, assigned to the depressions provided in the grooves of the sealing elements.

Other features which are considered as characteristic for the invention are set forth in the appended claims.

Although the invention is illustrated and described herein as embodied in a sealing element for a device for the fireproof lead-through of lines and the like through openings in walls, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
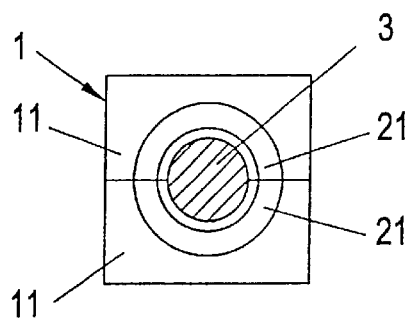
FIG. 1 is an end view of a packing piece with two sealing elements according to the invention.
Figure 2:
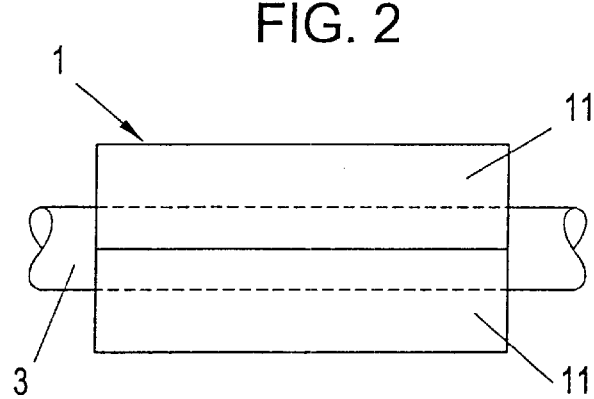
FIG. 2 is a side view of the packing piece according to the invention illustrated in FIG. 1.
Figure 3:
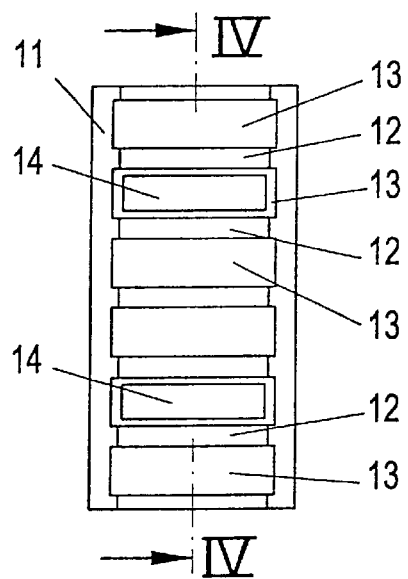
FIG. 3 is a plan view of a sealing element according to the invention.
Figure 4:
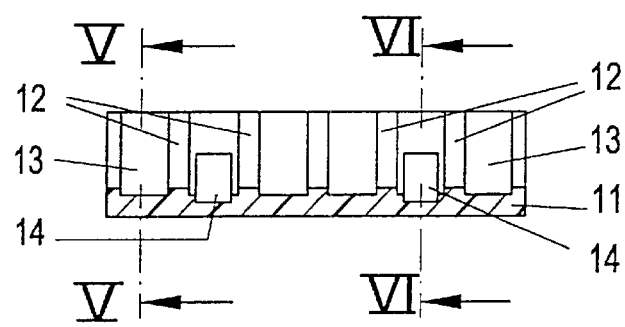
FIG. 4 is a longitudinal section through a sealing element according to the invention, taken along the line IV—IV shown in FIG. 3.
Figure 5:
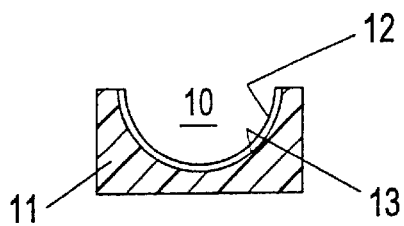
FIG. 5 is a section through a sealing element according to the invention, taken along the line V—V shown in FIG. 4.
Figure 6:
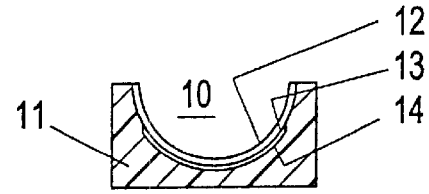
FIG. 6 is a section through a sealing element according to the invention, taken along the line VI—VI shown in FIG. 4.

Referring now to the figures of the drawing in detail and first, particularly, to FIGS. 1 and 2 thereof, a cuboidal packing piece 1 comprises two symmetrically formed sealing elements 11, which are each formed with an approximately semi-cylindrical recess and serve for receiving semi-cylindrical inserts 21, which are likewise formed with semi-cylindrical recesses. A line device 3 (cable, wire, pipe, conduit, etc.) is inserted into the through-channel formed as a result. In this case, the sealing elements 11 and the inserts 21 located in them must be formed in such a way that they closely enclose the line 3, in order thereby to ensure the security aimed for in terms of preventing fumes from a fire from passing through. At the same time, however, it is intended to allow a small number of sealing elements 11 of different sizes with inserts 21 to cater for different diameters of the lines.

Referring now to FIGS. 3 to 6, the individual sealing elements 11 are formed with an approximately semi-cylindrical recess 10. A wall bounding the recess 10 is formed with semi-annular ribs 12 and, between the latter, with semi-annular grooves 13. Moreover, some of the grooves 13 are formed with depressions 14.

Figure 7:
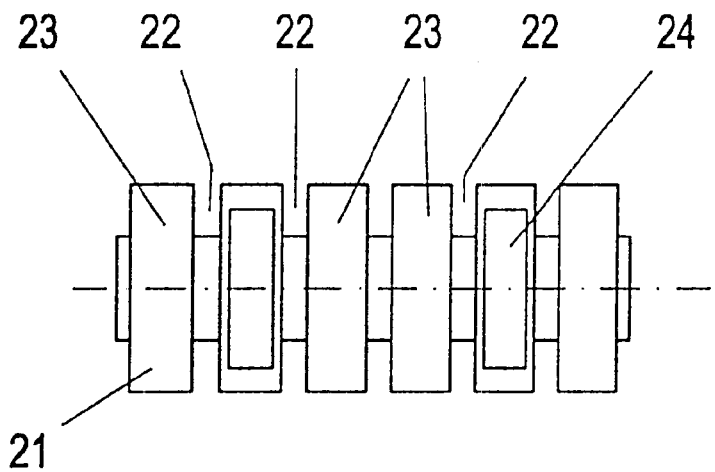
FIG. 7 is a plan view of an insert.
Figure 8:
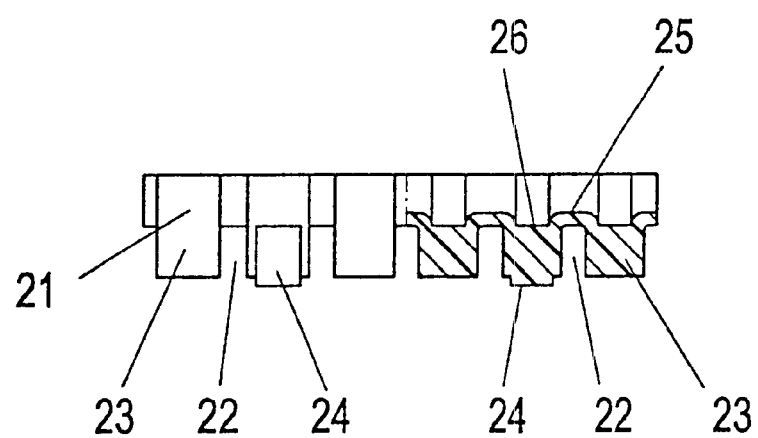
FIG. 8 is a partly broken-away side view of the insert according to FIG. 7.
Figure 9:
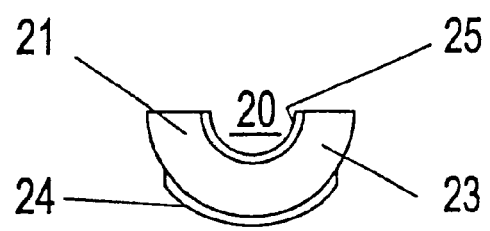
FIG. 9 is an end-on view of the insert according to FIG. 7.
Figure 10:
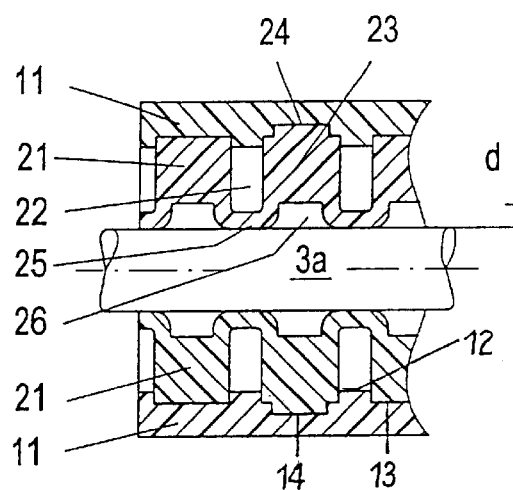
FIGS. 10, 10a; 11, 11a; and 12, 12a show three sealing elements according to the invention of different sizes, each with lines of different diameters inserted in them, and each illustrated in axial longitudinal section.
Figure 10A:
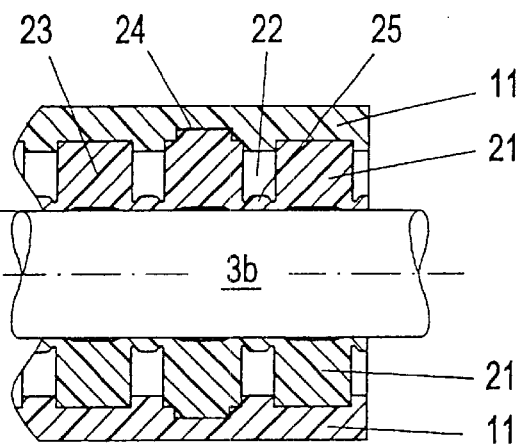
Figure 11:
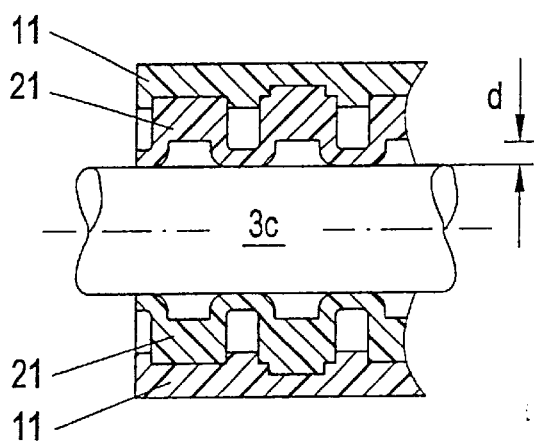
Figure 11A:
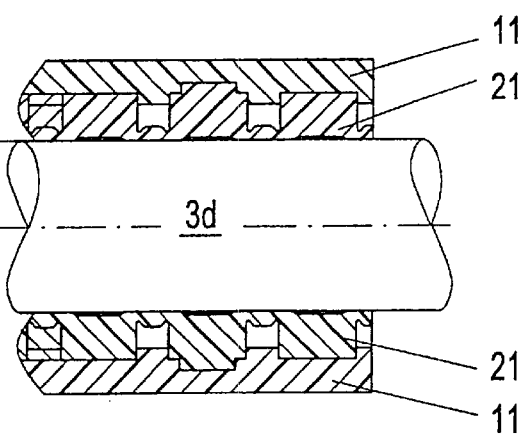
Figure 12:
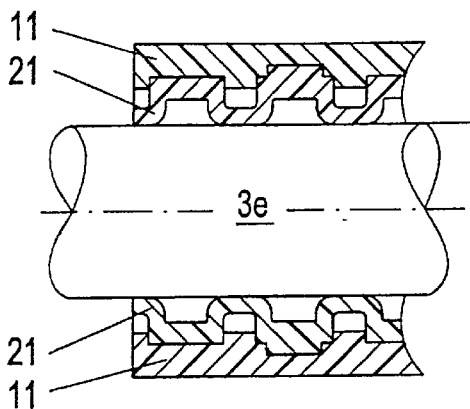
Figure 12A:
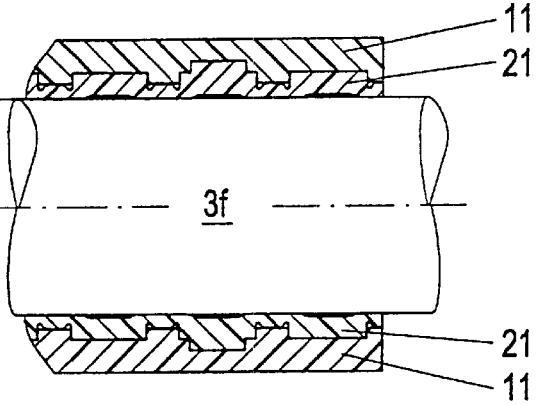

With reference to FIGS. 7 to 9, the inserts 21, which are formed approximately as half hollow cylinders with a semi-cylindrical recess 20, are also formed on their outer wall with grooves 22 and with ribs 23 located between these grooves. Some of the ribs 23 are moreover formed with additional projections 24. In this case, the grooves 22 of the inserts 21 are formed as equal and opposite in relation to the ribs 12 of the sealing elements 11 and the ribs 23 and the projections 24 are formed as equal and opposite in relation to the grooves 13 and to the recesses 14 of the sealing elements 11, although this equal and opposite relationship applies only to the position of these ribs and grooves and not to their height, since the depth of the grooves 22 is greater than the height of the ribs 12.

Moreover, the inner wall of the inserts 21 is also formed with semi-annular ribs 25 and with semi-annular grooves 26 located between the latter.

The equal and opposite profilings of the sealing elements 11 and of the inserts 21 on the mutually facing surfaces bring about the required positional stability of the inserts 21 in the sealing elements 11. Furthermore, the fact that the ribs 12 of the sealing elements 11 reach into the grooves 22 of the inserts 21 only over part of their height means that the ribs 25 located on the inner wall of the inserts 21 can penetrate into the grooves 22, whereby an adaptation of the clear widths of the channels formed by the inserts 21 to different diameters of lines, cables, pipes and the like inserted into the latter is brought about. This allows the inserts 21 to be restricted to a very small number of different sizes, without impairing their functionality as a result.

Reference is had in this respect to FIGS. 10 to 12 and 12a, wherein sealing elements 11 with three inserts 21 of different sizes are represented, each suitable for six lines, the lines 3a and 3b, 3c and 3d and 3e and 3f respectively differing in diameter by the value 2d.

I claim:

1. A device for fireproof lead-through of a line device through an opening in a wall, comprising:

a cuboidal packing piece formed of two sealing elements and cross-sectionally semi-cylindrical inserts inserted in said sealing elements;

said inserts being formed, on an inside thereof, with at least approximately semi-annular inner ribs and, on an outside thereof, with semi-annular outer ribs and with semi-annular grooves between said outer ribs;

said sealing elements being formed, on an inside thereof, with at least approximately semi-annular ribs and grooves configured to mesh with said semi-annular grooves and outer ribs on said inserts;

said inner ribs of said inserts being disposed radially inside said semi-annular grooves between said outer ribs of said inserts; and said inner ribs of said inserts being deformable and configured to penetrate into said semi-annular grooves on said inserts, whereby said inserts form through-channels configured to a diameter of a respectively inserted line device inserted in said packing piece.

2. The device according to claim 1, wherein said inserts are formed with semi-annular grooves between said inner ribs.

3. The device according to claim 1, wherein a width of said grooves of said sealing elements is approximately twice a width of said ribs of said sealing element.

4. The device according to claim 1, wherein some of said grooves of said sealing elements are formed with depressions.

5. The device according to claim 4, wherein some of said outer ribs protruding from said inserts are formed with additional projections, assigned to said depressions formed in said grooves of said sealing elements.

* * * * *